(12) United States Patent
Ramirez et al.

(10) Patent No.: US 6,412,067 B1
(45) Date of Patent: Jun. 25, 2002

(54) BACKING OUT OF A PROCESSOR ARCHITECTURAL STATE

(75) Inventors: Ricardo Ramirez, Cupertino; Michael J. Morrison, Santa Clara, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/132,042

(22) Filed: Aug. 11, 1998

(51) Int. Cl.[7] ................................................ G06F 15/00
(52) U.S. Cl. ...................................................... 712/245
(58) Field of Search ............................ 712/23, 25, 216, 712/225, 245

(56) References Cited

U.S. PATENT DOCUMENTS

| | | | |
|---|---|---|---|
| 5,797,013 A | * | 8/1998 | Mahadevan et al. ........ 712/241 |
| 6,047,370 A | | 4/2000 | Grochowski |
| 6,076,153 A | | 6/2000 | Grochowski et al. |
| 6,092,175 A | * | 7/2000 | Levy et al. .................... 712/23 |
| 6,182,210 B1 | | 1/2001 | Akkary et al. |
| 6,205,542 B1 | | 3/2001 | Grochowski et al. |
| 6,240,509 B1 | | 5/2001 | Akkary |

* cited by examiner

*Primary Examiner*—David Y. Eng
(74) *Attorney, Agent, or Firm*—Blakely, Sokoloff, Taylor & Zafman LLP

(57) ABSTRACT

An executed first instruction having a first logical operand as a destination is retired. A register assigned to the first logical operand is identified to back out of an architectural state. The identifying may be performed when an executed second instruction having a second logical operand as a destination is ready to retire or is retired. The register may be assigned to a third logical operand for an instruction to be executed.

42 Claims, 7 Drawing Sheets

BACKING OUT OF A PROCESSOR ARCHITECTURAL STATE

BACKGROUND OF THE INVENTION

1. Field of the Invention

The present invention relates generally to computers and processors, and more specifically, to delaying the deallocation of registers and backing out of architectural states.

2. Description of the Related Art

Processors fetch and execute a sequence of instructions from memory. The instructions ordinarily manipulate data stored in memory or registers. Typically, the processor decodes the instructions into first and second types of micro-instructions adapted to execute on particular types of hardware units. The first type of micro-instruction loads and stores data between the memory and registers, which are typically internal to the processor. The second type of micro-instruction manipulates data stored in the internal registers and writes the results from the manipulations back to the internal registers. Since the number of internal registers is limited, an absence of available internal registers may occur causing a bottleneck at the decode stage. The processor ordinarily employs methods that efficiently use the internal registers to reduce the occurrence of decode bottlenecks.

One mechanism for using the limited number of internal registers entails producing instructions through several operations. First, the processor decodes an incoming instruction into one or more instructions having logical operands. Hereafter, logical operands are defined to mean dummy variables for some source and destination addresses of instructions. Second, an allocator assigns one or more of the available internal registers to the logical operands introduced in the first step. Third, a retirement unit deallocates the previously assigned internal registers of executed instructions without substantial delay when other instructions no longer need to read the contents of the registers. Deallocation makes more internal registers available for assignment to newly decoded instructions. Thus, retirement units should rapidly deallocate registers to reduce the occurrence of instruction decode bottlenecks.

Processors also have hardware for recovering from what are referred to as execution "exceptions". Exceptions may be attributable to interrupts and faults generated during execution of instructions. Recovering from an exception involves both detecting the exception and reporting the exception to hardware that may re-execute any improperly executed instructions. The proper re-execution nominally involves returning the processor to a pre-exception state. Thus, re-execution may include restoring original data to internal registers and reinserting the excepting instruction and the instructions dependent thereupon back into execution pipelines.

A system designed to detect and report all exceptions may employ substantial hardware, i.e., a large area on the processor chip, and may encumber the ordinary retirement cycle. The detection of complex fault events may entail heavy area and time costs, because more verifications are ordinarily employed to check for complex faults. Complex fault detection may slow the retirement process with verifications for rarely occurring faults.

For a macro-instruction, $I_1$, decoding into a sequence $\mu I_1$, $\mu I_2$, etc., an exception may occur on both the earlier and later members of the sequence, e.g., $\mu I_1$, or $\mu I_2$. Two methods may be pursued to recover from an exception on a later member, e.g., $\mu I_2$. First, the processor may correct the condition causing the exception and re-execute only the excepting instructions by (a) detecting which instruction excepted, and (b) reinstating the initial execution state associated therewith. Second, the processor may correct the condition causing the exception and re-execute the entire sequence, i.e., $\mu I'_1$, $\mu I'_2$, etc., whenever any member of the sequence registers an exception. Implementing either of the above methods may be problematic.

Since detecting exceptions on individual members of a sequence may be complex, re-executing the entire sequence from decoding the macro-instruction may save time and reduce hardware needs. But, the sequence from the macro-instruction may include "retired" instructions, because earlier members, e.g., $\mu_1$, may have completed execution. For example, the instruction $R+R' \rightarrow R$ destroys the original data in R when the instruction is retired, i.e., the architectural state has changed. Thus, executing earlier members of the sequence, e.g., $\mu I_1$, may be problematic. Prior art processors may not handle exceptions on instructions produced by decoding a single macro-instruction inefficiently.

The present invention is directed to overcoming, or at least reducing the effects of, one or more of the problems set forth above.

SUMMARY OF THE INVENTION

A first aspect of the present invention provides an apparatus. The processor has a plurality of registers. The processor is capable of re-executing at least one selected instruction by backing out of an architectural register state. A second aspect of the present invention provides a method for backing a processor out of an architectural state. The method comprises reassigning a register to a logical operand of an instruction, the register having been assigned to the logical operand in a previous architectural state; and re-executing the instruction.

BRIEF DESCRIPTION OF THE DRAWINGS

Other objects and advantages of the invention will become apparent upon reading the following detailed description and upon reference to the drawings in which.

Figure 2:
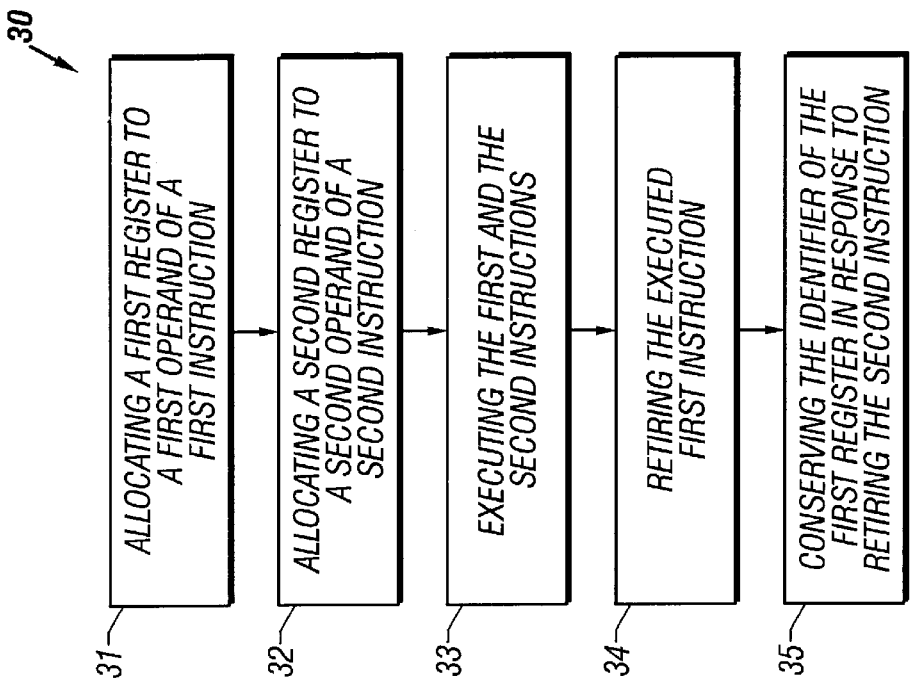
FIG. 2 is a flowchart illustrating an embodiment of a method for executing instructions in the processor of FIG. 1.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Specific embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort, even if complex and time-consuming, would be a routine undertaking for those of ordinary skill in the art having the benefit of this disclosure.

Hereafter, an architectural state is the state of a processor's registers and memories after writes by all executed instructions determined to have executed properly, i.e., after writes by all properly retired instructions. A speculative state is the state of processor's registers and memories after writes by all executed instructions, i.e., after writes by all executed instructions whether or not the instructions have been determined to have executed properly. A processor updates a speculative state to an architectural state after a retirement unit determines that the instructions, which will update the state, have properly executed.

Figure 1:
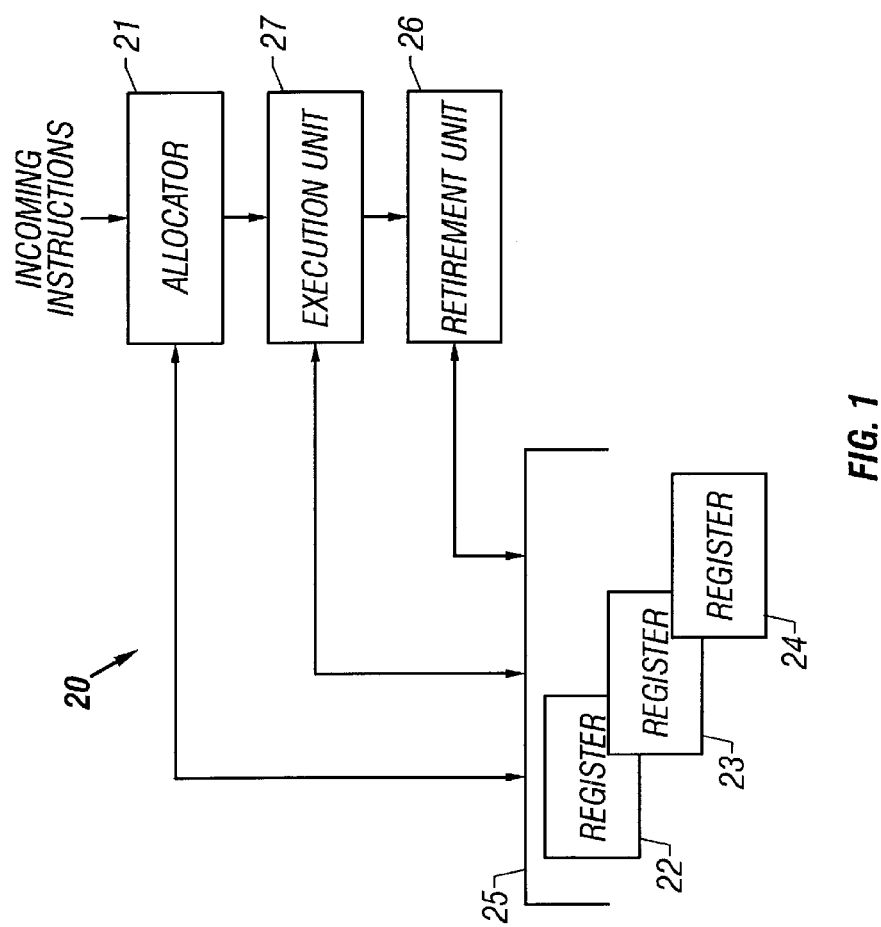
FIG. 1 is a high-level block diagram of an embodiment, in accordance with the present invention, of a processor that delays the deallocation of a portion of the registers.

FIG. 1 is a high-level block diagram illustrating a portion of a first embodiment of a processor 20 that delays the deallocation of selected registers. In some embodiments, the selected registers include all internal registers. An allocator 21 is a hardware device that assigns registers 22, 23, 24 to a portion of the logical operands of incoming instructions. In some embodiments, the registers 22, 23, 24 belong to a register file 25, i.e., a hardware structure for handling and directing accesses of the plurality of internal registers 22, 23, 24. A retirement unit 26 retires instructions that have been executed by an execution unit 27. The retirement unit 26 deallocates the registers 22, 23:, 24 that were assigned to the executed instructions. Deallocation makes the registers 22, 23, 24 available for assignment to new incoming instructions by the allocator 21. The retirement unit 26 delays the deallocation of a selected portion of the registers 22, 23, 24.

Still referring to FIG. 1, the registers 22, 23, 24 may be classified into available registers, used registers, and delayed registers. The allocator 21 may assign an "available" register to a logical operand of an incoming instruction. The allocator 21 may not assign either "used" or "delayed" registers to the logical operands of incoming instructions. The "used" and the "delayed" registers are not deallocated in the sense that the allocator 21 may not reassign them to a destination logical operand of an incoming instruction. By definition, at least one instruction may read or write a "used" register. Active instructions may neither read nor write "delayed" registers. The processor 20 saves the identifiers of "delayed" registers. Register identifiers are physical addresses. Thus, execution results in "delayed" registers may be accessed and used even though the instructions that produced the results are retired, and the results have been removed from the processcor's architectural state.

Hereafter, a class of registers stores a type of data, e.g., floating-point data, integer data, predicate values, multimedia data, etc. The term class may also apply to logical operands, e.g., floating-point data, integer data., predicate values, multimedia data, etc. In various embodiments, the classes may also store types of data, which are not numerated above.

FIG. 2 is a flowchart illustrating an embodiment of a method 30 for executing instructions in the processor 20 of FIG. 1. At block 31, the allocator 21 assigns a first register 23 to a first logical operand of a first instruction. At block 32, the allocator 21 assigns a second register 24 to a second logical operand of a second instruction. The second instruction follows the first instruction in the instruction sequence. In the illustrated embodiments, the first and second logical operands are the same logical operand. In other embodiments, the first and second logical operands may be different logical operands as long as they belong to the same preselected class, e.g., floating point. At block 33, the execution unit 27 executes the first and second instructions. At block 34, the retirement unit 26 retires the executed first instruction. At block 35, the retirement unit 26 saves the identifier of the first register in response to retiring the second instruction. The first register 23 is a "delayed" register, i.e. the contents therein may still be retrieved.

Still referring to FIGS. 1 and 2, the retirement unit 26 delays the deallocation and saves the identifiers of preselected classes of the registers 22, 23, 24 and logical operands or of the registers of selected classes of instructions. Different embodiments may select different classes of the registers 22, 23, 24 and logical operands or different classes of instructions. In specific embodiments, the retirement out 26 may delay the deallocation of one or of more than one selected class of registers. In some embodiments, the retirement unit 26 may delay the deallocation of the registers 22, 23, 24 associated with specific instruction classes, e.g., one or more registers 22, 23, 24 assigned to instructions resulting from the decoding of a selected single macro-instruction.

Figure 3:
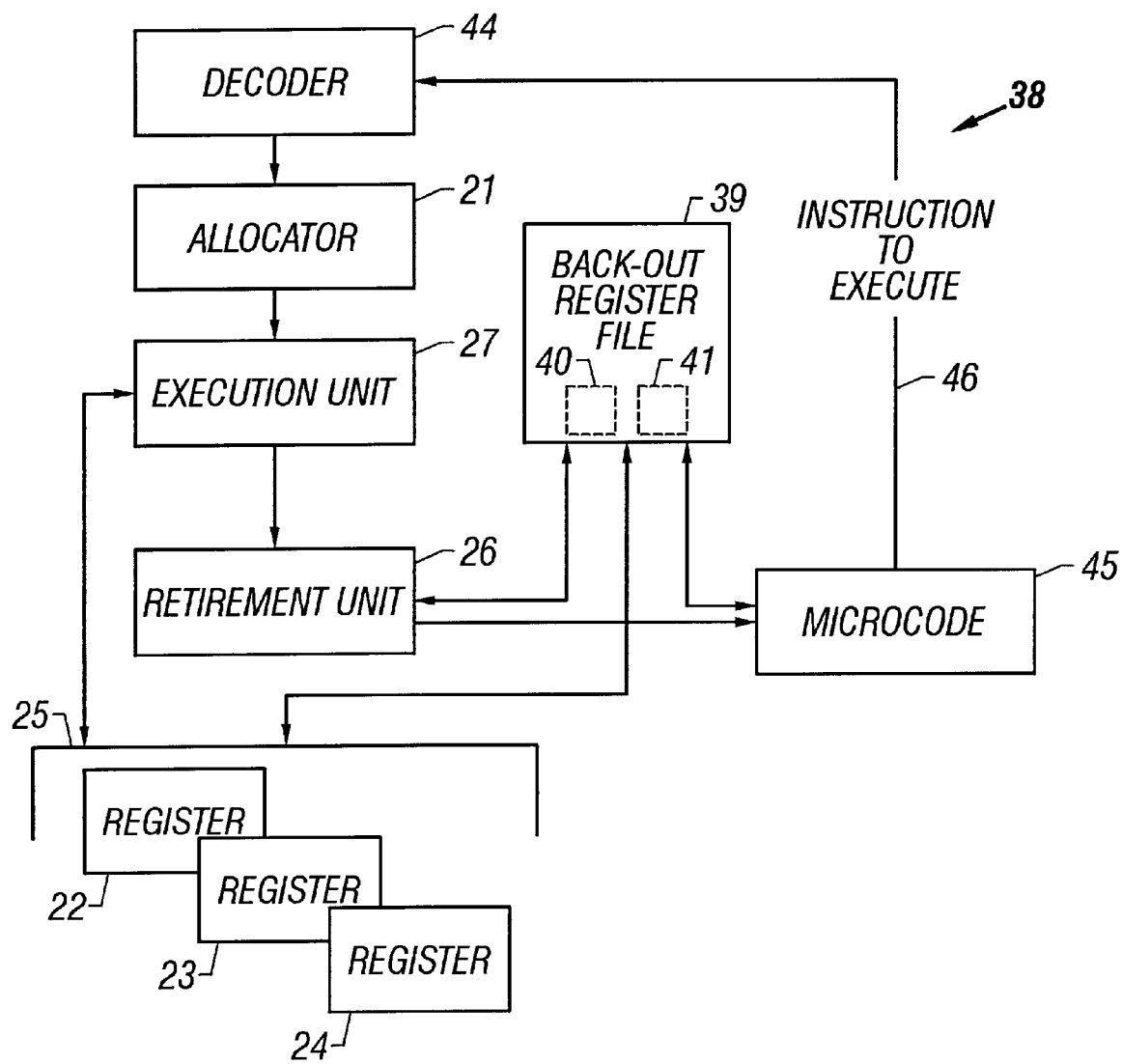
FIG. 3 is a high-level block diagram of an embodiment of a processor having a back-out register for use in delaying the deallocation of selected registers.

Some embodiments in accordance with the invention may employ "backing out" of an architectural state in a processor that speculatively executes instructions. FIG. 3 is a high-level block diagram illustrating one embodiment of a processor 38 that includes a back-out register file 39 to delay the deallocation of selected registers. The back-out register file 39 has storage positions 40, 41 to save the identifiers of the registers 22, 23, 24, previously assigned to the selected destination logical operand of one or more retired instructions. The back-out register file 39 may comprise one or several registers. The retirement unit 26 writes the identifier of the register 22, 23, 24 assigned to a destination logical operand of a selected and retired first instruction to the back-out register file 39 in response to retiring a second instruction belonging to the same class. In some embodiments, the second instruction is an instruction having the same destination logical operand as the first instruction. In the prior art, the previously assigned registers might have been deallocated, because unretired instructions may no longer read the data stored in the register assigned to the first instruction after the retirement of the second instruction having the same destination logical register. The portion of the registers 22, 23, 24 with identifiers stored in the back-out register file 39 are "delayed" registers.

Still referring to FIG. 3, the processor 38 re-executes instructions in response to selected exceptions detected by the retirement unit 26. A decoder 44 translates incoming instructions into sequences of instructions, and sends the instructions to the allocator 21. The retirement unit 26 detects selected exceptions and sets instructions for re-execution in response to the selected exceptions. The retirement unit 26 may signal microcode 45 to prepare instructions for re-execution. Microcode is a combination of hardware and specialized permanent memory, e.g., read-only memory (ROM), that performs a special function and is ordinarily internal to the processor. In response to the signal from the retirement unit 26, the microcode 45 reads the back-out register file 39 to obtain the identifiers of the portion of the registers 22, 23, 24 previously assigned to the selected logical operands. The microcode 45 produces machine code for the instructions for re-execution. During the re-execution, selected logical operands are assigned the portion of the registers 22, 23, 24, which were previously assigned and correspond to the identifiers saved in the back-out register file 39, i.e. the "delayed registers. The microcode 45 introduces the previous register assignments in the machine code of the instructions for re-execution. This may be referred to as " backing out architectural register assignments." An output line 46 sends the instructions to re-execute from the microcode 45 to the execution unit 27.

Figure 4:
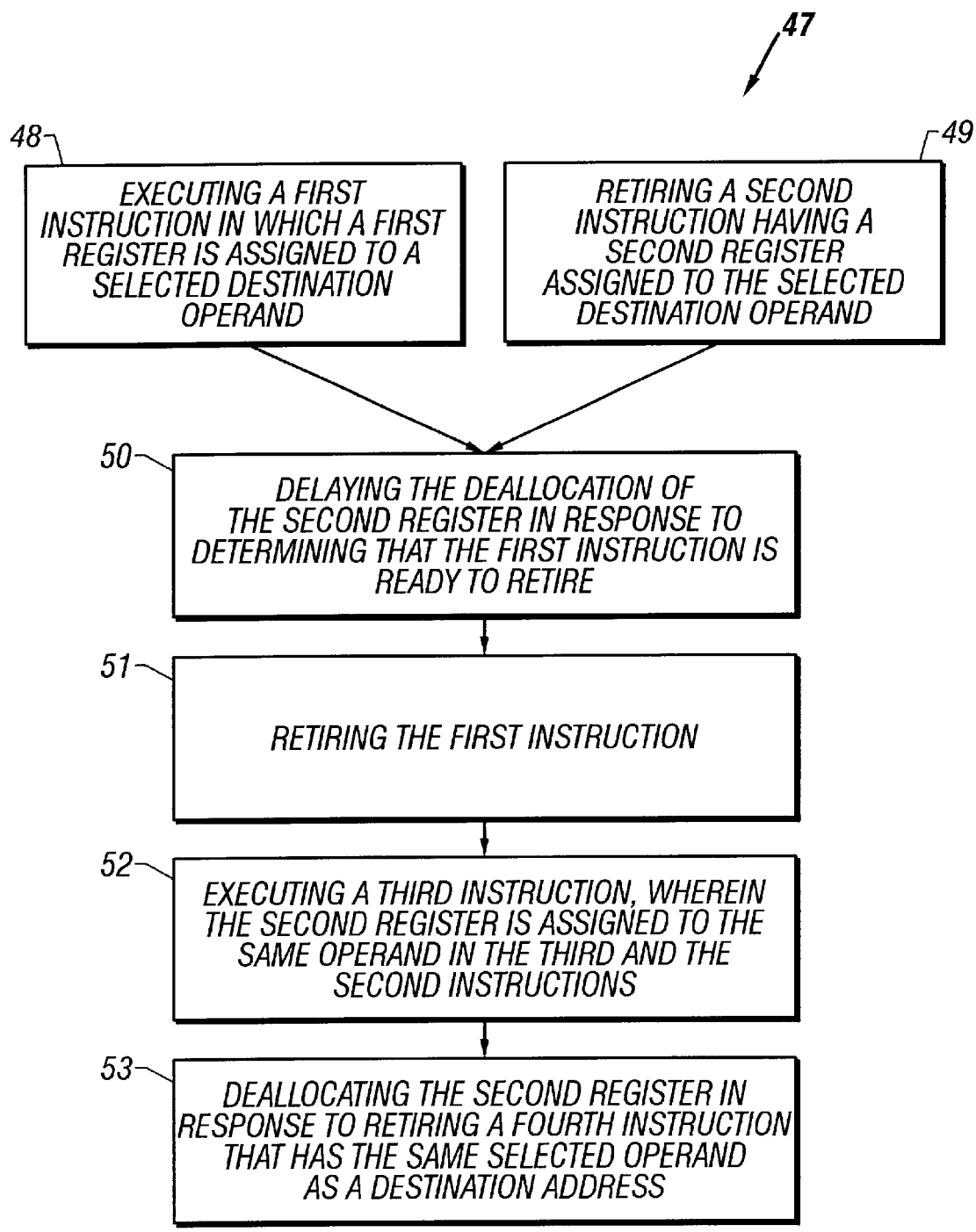
FIG. 4 is a flowchart illustrating an embodiment of a method for re-executing selected instructions in the processor of FIG. 3.

FIG. 4 is a flowchart illustrating an embodiment of a method 47 for re-executing selected instructions in the processor 38 of FIG. 3. The method includes backing out of an architectural register state. At block 48, the processor 38 executes a first instruction having a first register 23 as a destination address. At block 49, the retirement unit 26 retires a second instruction having a second register 22 as a destination address. The first and second registers 23, 22 have been assigned to the same selected logical operand by the allocator 21. At block 50, the retirement unit 26 makes the second register 22 a "delayed" register in response to determining that the first instruction is ready to retire. At block 51, the retirement unit 26 retires the first instruction, already having retired the second instruction. At retirement, the first register 23 becomes an architectural register that may still be read by unretired instructions. At block 52, the processor 38 re-executes a third instruction having the selected logical operand as a source or as a destination address. The third instruction may be one of the above-mentioned instructions or another instruction. Re-executing includes reassigning the second register 22, i.e. a delayed register, to the same selected logical operand in the third instruction. By reassigning the second register to the selected logical operand, re-execution backs out of the architectural assignment.

Referring still to FIG. 4, some embodiments may deallocate a register if another instruction having a destination register of the selected class retires. For example, at block 53, the retirement unit 26 deallocates the second register 22 in response to retiring a fourth instruction having the different register 24 assigned to the same logical operand. In other embodiments (not shown), the storage positions 40, 41 may store the identifiers of both the portion of the registers 22, 23, 24 previously assigned and before previously assigned to the selected logical operands. Such an embodiment may back-out of several changes to the architectural register state. In other embodiments, the storage positions 40, 41 may store the identifiers of a portion of the registers 22, 23, 24 previously assigned to several selected logical operands.

Figure 5:
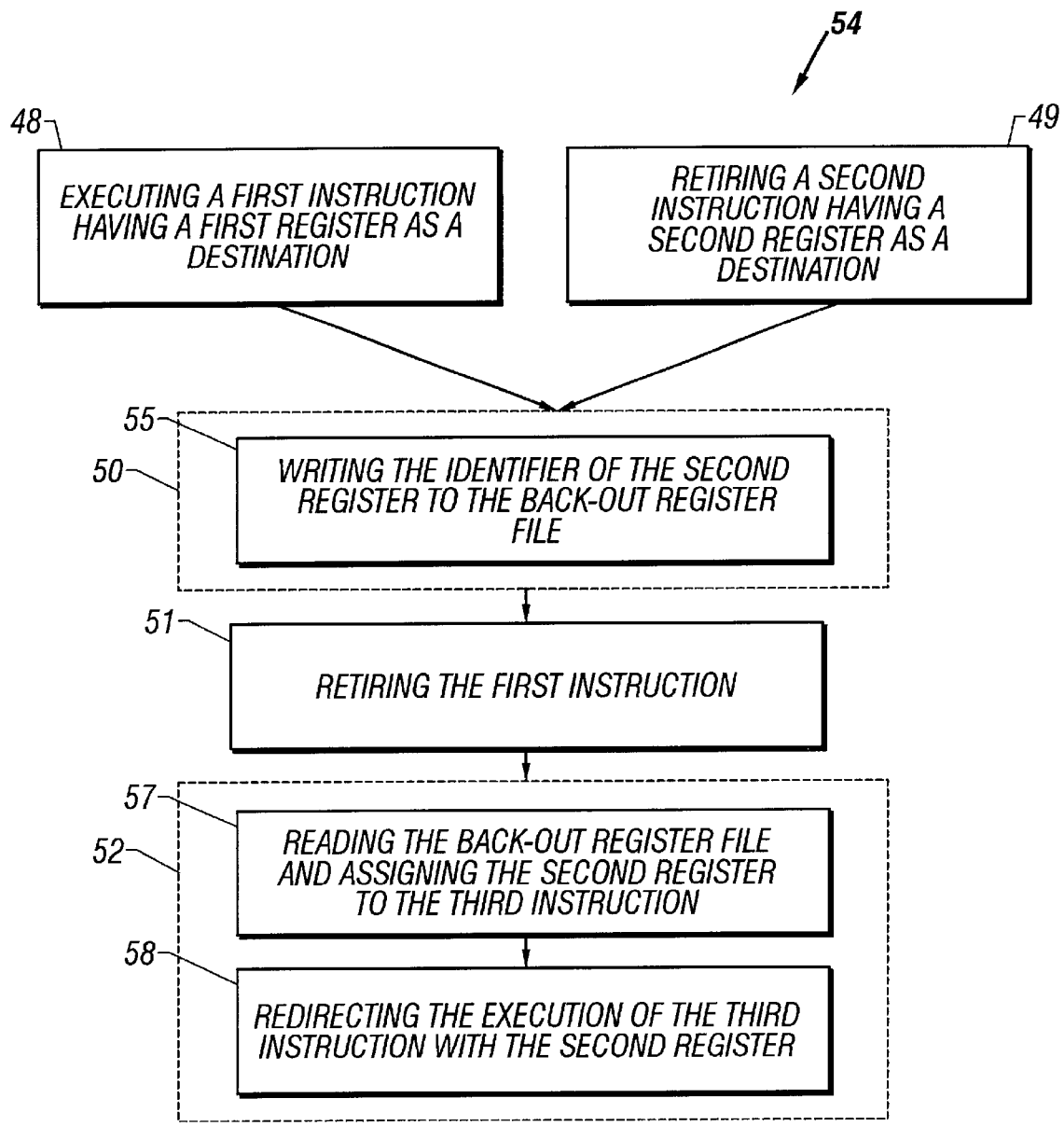
FIG. 5 is a flowchart illustrating an embodiment of a method of re-executing selected instructions in the processor of FIG. 3 by backing out of an architectural state.

FIG. 5 is a flowchart illustrating an embodiment of a method 54 of re-executing instructions in the processor 38 of FIG. 3 by backing out of an architectural register state. Blocks 48, 49, 50, 51, and 52 were described in FIG. 4. At block 55, the retirement unit 26 writes the identity of the second register 22 to one of the positions 40, 41 of the back-out register file 39 . The positions 40, 41 correspond to a destination logical operand X to which the second register was assigned by the allocator 21. At block 56, the retirement unit 26 sets a third instruction for re-execution, e.g., in response to an exception. The third instruction has the X logical operand as a source address. At block 57, the microcode 45 reads the back-out register file 39 to determine the identifier of the previously assigned register for the logical operand X, i.e. the second register 22, and reassigns the identifier therefrom to the logical operand X in the third instruction. At block 58, the microcode 45 redirects the decoder 44 to send the third instruction for re-execution with the logical operand X replaced by the second register 22. Thus, the processor 38 backs out of an architectural register state to re-execute the third instruction.

In one embodiment, the first and second instructions of FIGS. 4 and 5 result from decoding an incoming "packed" floating-point macro-instruction, i.e., an instruction performing several floating-point operations in parallel, or multimedia macroinstruction. In this embodiment, the exceptions stimulating a back-out of an architectural state occur on the second or later sequential instruction of the same class. The processor 38 of FIG. 3 recovers from exceptions on either the first or the second instructions by correcting and re-executing both. In some embodiments, correcting and re-executing both instructions may reduce the time and hardware used to detect exceptions. The architectural register state is no longer proper for re-executing the first or earlier sequential instruction, but the back-out register file 39 enables the processor 38 to restore the proper register state.

Some embodiments may increase efficiency by re-executing all instructions coming from decoding a selected macro-instruction even when only a subset of the instructions encounter exceptions. This method may reduce the amount of hardware employed for detecting exceptions. Similarly, less operating time may be used to determine whether any, as opposed to which, of the selected instructions encountered an exception. In some embodiments, the time costs to individually detect the selected exceptions are high, and the selected exceptions are rare. Then, the added time to re-execute all the instructions coming from decoding a single macroinstruction may be less than the total time saved. Then, re-execution by the back-out methods of FIGS. 4 and 5 may increase the effective performance of a processor.

Figure 6:
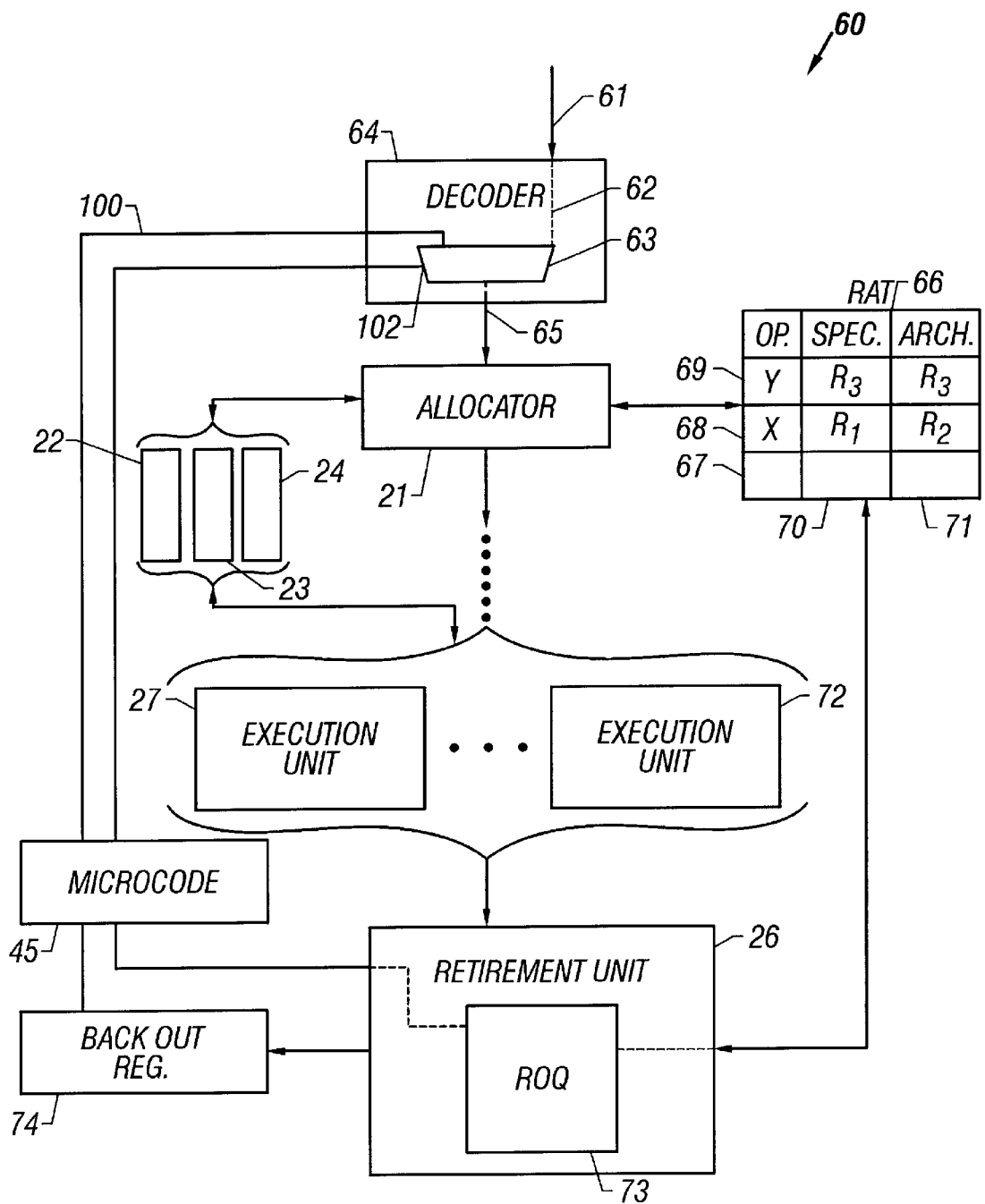
FIG. 6 is high-level block diagram of an embodiment of a processor which implements speculative execution and also backs out of architectural states for re-executions involving selected registers.

FIG. 6 is a high-level block diagram illustrating an embodiment of an out-of-order processor 60 that employs speculative execution and also backs out of some architectural states for re-executions involving selected registers 22, 23, 24. A line 61 brings incoming instructions to a decoder 64. The decoder 64 includes a multiplexer (MUX) 63 having first and second input ports 62, 100. The first and second input ports 62, 100 receive newly decoded instructions and instructions for re-execution, respectively. The decoder 64 sends instructions from an output port 65 of the MUX 63 to the allocator 21. The allocator 21 may write and read identifiers of a portion of the registers 22, 23, 24 to and from a register allocation table ("RAT") 66. The rows 67, 68, 69 of the RAT 66 have both speculative and architectural assignment positions 70, 71 to store the identifiers of the portion of the registers 22, 23, 24 assigned to the destination logical operands of the instructions. The execution units 27, 72 in the particular embodiment of FIG. 6 may also execute the instructions out-of-order. A reorder queue ("ROQ") 73 saves the original instruction sequence so that retirement of executed instructions, may be performed in-order. The retirement unit 26 may write the identifiers of selected classes of the registers 22, 23, 24 to a back-out register 74 having one or more storage positions (not shown).

Still referring to FIG. 6, the allocator 21 assignments are initially speculative. The retirement unit 26 flushes unretired instructions from portions of the processor 60 between the allocator 21 and the retirement unit 26 in response to certain exceptions. To recover from the exceptions, the processor 60 may copy the entries of the architectural assignment positions 71 to the speculative assignment positions 70. Then, re-execution of unretired and improperly executed instructions may start from the earlier state defined by the architectural register assignments. The speculative assignments become architectural in response to the proper retirement of the instruction to which the assignments were made. Thus, re-execution in response to such exceptions, as opposed to the selected exceptions of FIGS. 1–5, does not entail backing out of the "architectural" state defined by the assignments of retired instructions.

Figure 7:
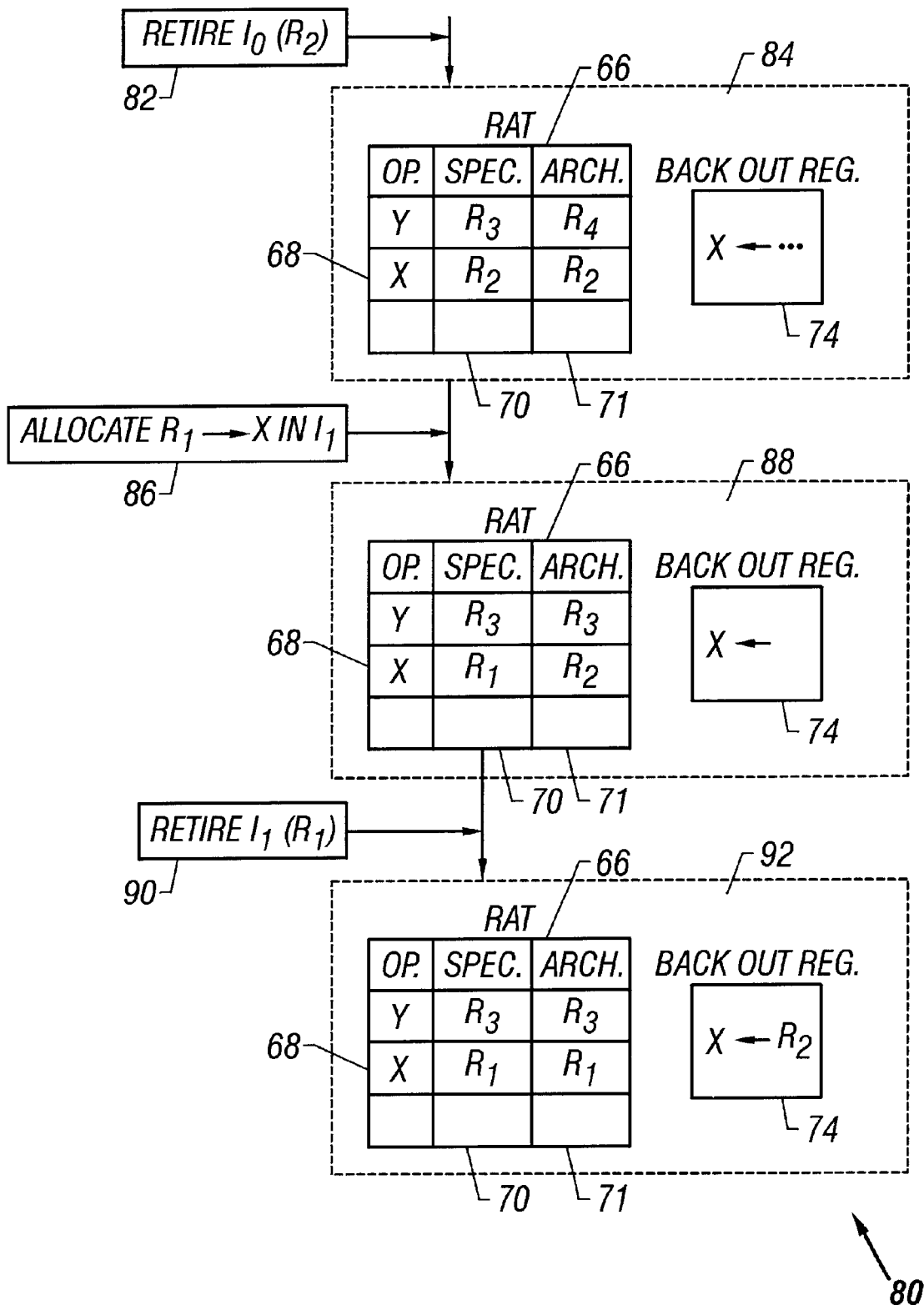
FIG. 7 illustrates a time line of the register allocation table and back-out register as instructions progress through the processor of FIG. 6.

FIG. 7 is a time line 8,0 of the RAT 66 and the back-out register 74 as instructions $I_0$ and $I_1$ progress through the embodiment of the processor 60 illustrated in FIG. 6. At block 82, the instruction $I_0$ retires. At block 84, the row 68 of the RAT 66 for the logical operand X stores the identifier of the register $R_2$ in both the speculative and the architectural assignment positions 70, 71, because allocator 21 had assigned register $R_2$ to $I_0$. The speculative and architectural assignment positions 70, 71 may store identical identifiers between the retirement of an instruction and the allocation of a new register 22, 23, 24 to a second instruction having the same destination logical operand as the first instruction.

At block 84 of FIG. 7, the entries $R_2$, $R_3$, and $R_4$ of the RAT 66 are "used" registers, meaning they may be read by active and/or incoming instructions. Active and incoming instructions may read data from the registers $R_2$ and $R_3$ in the speculative assignment positions 70. Active and incoming instructions may also read the registers $R_2$ and $R_4$ in the architectural assignments positions 71 if the retirement unit 26 copies architectural register assignments to corresponding speculative assignments in response to an exception. As discussed in respect to FIG. 6, this corresponds to a re-execution without a back out from an architectural state, which is instituted for certain exceptions in the embodiment of FIG. 6. The register identifiers $R_2$, $R_3$, and $R_4$ in either the speculative or the architectural assignment positions 70, 71 correspond to physical addresses of "used" registers 22, 23, 24, because unretired instructions may read the data stored therein in this embodiment.

Still referring to FIG. 7, the allocator 21 assigns the register $R_1$ to the logical operand X of the instruction $I_1$ at block 86. At block 88, the speculative assignment position 70 for the logical operand X stores the identifier $R_1$ in response to assignment of block 86. At block 90, the instruction $I_1$ retires without exceptions. At block 92, the retirement unit 26 writes the identifier $R_1$ to the architectural assignment position 71 for the logical operand X and writes the identifier $R_2$, from the previous architectural assignment for X, to the back-out register 74. The register $R_2$ is a "delayed" register, as defined above, because unretired instructions may not read $R_2$ even in response to an exception. The register $R_2$ may be read if the processor 60 performs a re-execution by backing out of the writes by retired instructions, i.e., instructions that were properly executed.

Referring back to FIG. 6, the processor 60 may handle a selected class of exceptions in a manner that includes backing out of writes by selected retired instructions, i. e., instructions that have been determined to have properly executed. In one embodiment, the processor 60 backs out of writes by the retired instructions to execute a new instruction in response to the selected class of exceptions. The new instruction is executed in a "previous" architectural register state. The back-out register 74 stores register assignments for logical operands of the selected retired instructions. These register assignments enable backing out of the present architectural register state so that the execution of the new instruction can be performed with the "previous" architectural state.

In some embodiments, back-out execution enables the processor 60 to execute an entire sequence of instructions in a previous architectural register state. For example, one embodiment performs a back-out execution of a new sequence of instructions, i.e., $\mu I'_1$, $\mu I'_2$, etc., in response to exceptions occurring on any instruction of a selected sequence $\mu I_1$, $\mu I_2$, etc., wherein the sequence comes from decoding one macro-instruction. The new sequence $\mu I'_1$, $\mu I'_2$, may differ from the original sequence, $\mu I_1$, $\mu I_2$, etc., to correct the problems that caused the exception. In this embodiment, the processor 60 effectively re-executes all of the sequence, e.g., $\mu I_1$, $\mu I_2$, etc., even though the architectural state has changed due to the retirement of earlier instructions of the sequence, i.e., instructions not registering exceptions. In some embodiments, such a procedure may reduce the hardware and time costs employed for detecting the selected exceptions.

Referring to FIG. 6, the retirement unit 26 delays the deallocation of selected registers 22, 23, 24 of previously retired instructions by transferring the corresponding identifiers of the registers 22, 23, 24 from the architectural assignment positions 71 to the back-out register 74. The retirement unit 26 does not inform the allocator 21 that the delayed registers 22, 23, 24 are available. The retirement unit 26 writes the identifiers of the registers 22, 23,24 of the previously retired instructions to the back-cut register 74 in response to determining that a later instruction, having the same destination logical operand, is ready to retire.

Referring still to FIG. 6, the decoder 64 receives instructions for back-out re-execution from line 100. The retirement unit 26 directs the back-out re-execution by a signal to a select input port 102 of the MUX 63. The selected logical operands of the instructions for back-out re-execution are assigned register identifiers from the back-out register 74. For example, the logical operand X becomes the register $R_2$ in the example of block 92 in FIG. 7. In some embodiments, microcode 45 creates the machine code for the instructions for back-out re-execution. The machine code may also contain one or more bits that direct the allocator 21 not to assign other registers 22, 23, 24 to logical operands already assigned identifiers of "delayed" registers.

Figure 8:
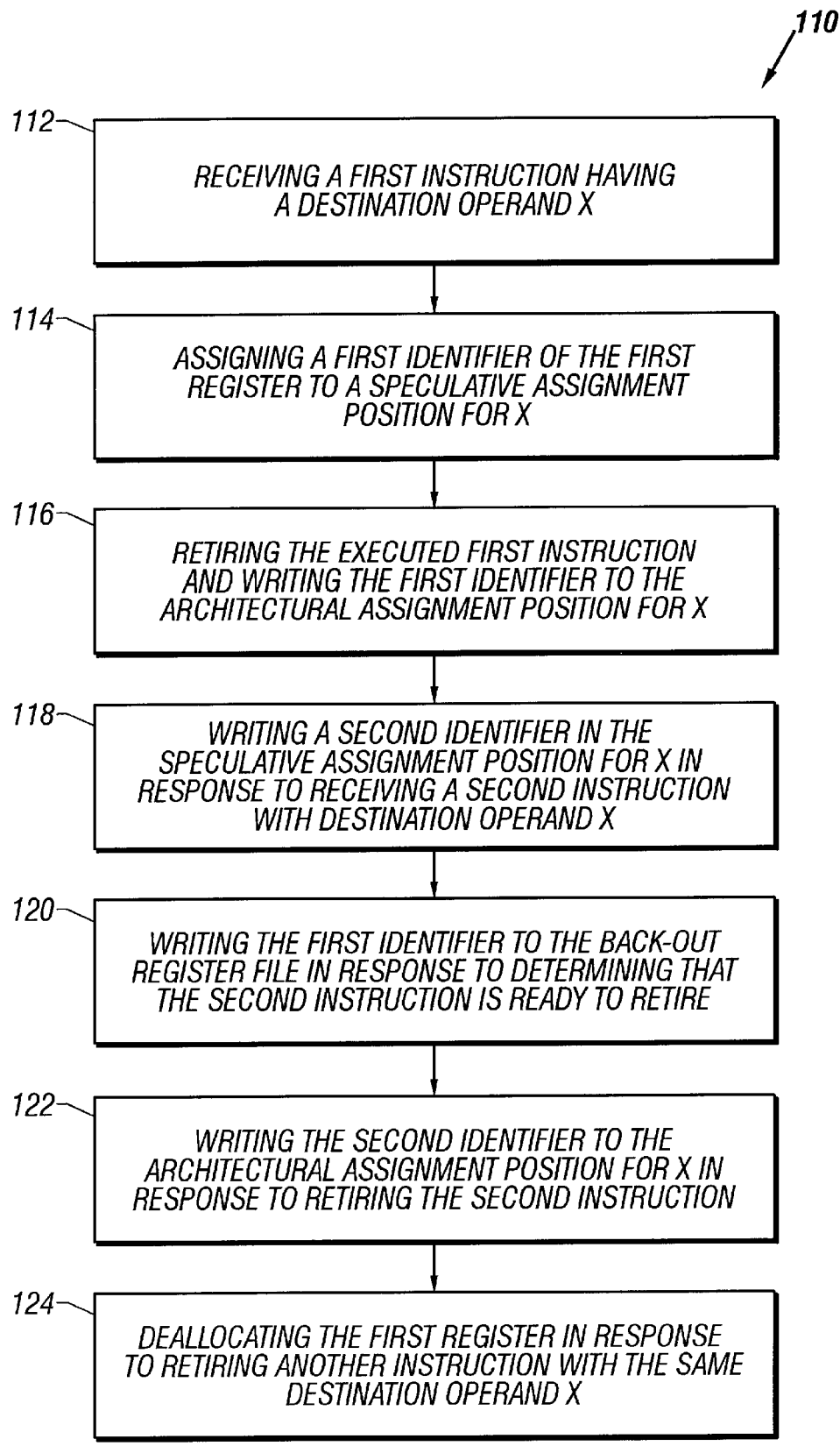
FIG. 8 is a flowchart illustrating an embodiment of one method of operating the processor of FIG. 6.

FIG. 8 is a flowchart illustrating an embodiment 110 of a method of operating of the processor 60 of FIG. 6. At block 112, the allocator 21 receives a first instruction having a destination logical operand X. At block 114, the allocator 21 assigns a first register to the logical operand X and writes the corresponding first identifier thereof to the speculative assignment position 70 in the RAT 66 for X. Subsequent instructions with the source logical operand X will read the first register. At block 116, the retirement unit 26 retires the executed first instruction and writes the first identifier to the architectural assignment position 71 for X. At block 118, the allocator 21 writes a second identifier, corresponding to a second register, to speculative assignment position 70 for X in response to the second instruction having the address logical operand X. At block 120, the retirement unit 26 writes the first identifier from the architectural assignment position 71 for X to the back-out register 74 in response to determining that the second instruction is ready to retire. Now, the first register is a delayed register, and active and/or incoming instructions may neither read or write from or to the first register. At block 122, the retirement unit 26 writes the second identifier to the architectural assignment position 71 for X in response to retiring the second instruction. At block 124, some embodiments deallocate the first register in response to retiring another instruction with the destination logical operand X.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
    delaying deallocation of a register assigned to a logical operand of a retired executed instruction having the logical operand as a destination;
    assigning the register to the same logical operand for an instruction to be re-executed; and
    executing the instruction to be re-executed.

2. The method of claim 1, wherein the delaying is performed when an instruction other than the retired executed instruction is ready to retire or is retired.

3. The method of claim 1, wherein the delaying comprises writing an identifier for the register to a back out register.

4. The method of claim 1, wherein the assigning is performed in response to detecting an exception.

5. The method of claim 1, wherein the assigning comprises using microcode to assign the register to the same logical operand for the instruction to be re-executed.

6. A method comprising:
    retiring an executed first instruction having a first logical operand as a destination;
    retiring an executed second instruction having a second logical operand as a destination; and
    delaying deallocation of a register assigned to the first logical operand to back out of an architectural state, wherein the delaying is performed when the second instruction is ready to retire or is retired.

7. The method of claim 6, comprising decoding a macro-instruction to generate the first and second instructions.

8. The method of claim 6, wherein the delaying comprises writing an identifier for the register to a back out register.

9. The method of claim 8, wherein the writing comprises writing the identifier to a position corresponding to the first logical operand.

10. The method of claim 6, wherein the retiring the executed first instruction comprises writing an identifier for the register from a speculative state position in a register allocation table to an architectural state position in the register allocation table; and
    wherein the delaying comprises writing the identifier for the register from the architectural state position in the register allocation table to a back out register.

11. The method of claim 6, wherein the first and second logical operands are the same.

12. The method of claim 6, wherein the first and second logical operands each belong to a same class of operands.

13. The method of claim 6, wherein the first and second instructions each belong to a same class of instructions.

14. The method of claim 6, comprising:
    assigning the register to a third logical operand for an instruction to be executed; and
    executing the instruction to be executed.

15. The method of claim 14, wherein the first, second, and third logical operands are the same.

16. The method of claim 14, wherein the assigning is performed in response to detecting an exception.

17. The method of claim 14, wherein the instruction to be executed has already been executed.

18. The method of claim 14, wherein the assigning comprises using microcode to assign the register to the third logical operand for the instruction to be executed.

19. The method of claim 6, comprising deallocating the register when an executed third instruction having another register assigned for a third logical operand as a destination is ready to retire or is retired.

20. A processor comprising:
    a plurality of registers;
    an allocator to assign registers to logical operands of instructions;
    at least one execution unit to execute instructions; and
    a retirement unit to retire executed instructions and to deallocate registers for retired instructions, the retirement unit to delay deallocation of a register assigned to a first logical operand of a retired first instruction having the first logical operand as a destination to back out of an architectural state, the retirement unit to delay deallocation of the register assigned to the first logical operand when a second instruction having a second logical operand as a destination is ready to retire or is retired.

21. The processor of claim 20, comprising a decoder to decode a macro-instruction to generate the first and second instructions.

22. The processor of claim 20, the retirement unit to write an identifier for the register to a back out register.

23. The processor of claim 22, the retirement unit to write the identifier for the register to a position corresponding to the first logical operand.

24. The processor of claim 20, the retirement unit to write an identifier for the register from a speculative state position in a register allocation table to an architectural state position in the register allocation table when the first instruction is retired and to write the identifier for the register from the architectural state position in the register allocation table to a back out register when the second instruction is ready to retire or is retired.

25. The processor of claim 20, wherein the first and second logical operands are the same.

26. The processor of claim 20, wherein the first and second logical operands each belong to a same class of operands.

27. The processor of claim 20, wherein the first and second instructions each belong to a same class of instructions.

28. The processor of claim 20, comprising microcode to assign the register to a third logical operand for an instruction to be executed.

29. The processor of claim 28, wherein the first, second, and third logical operands are the same.

30. The processor of claim 28, the microcode to assign the register to the third logical operand in response to an exception.

31. The processor of claim 28, wherein the instruction to be executed has already been executed by the at least one execution unit.

32. The processor of claim 20, the retirement unit to deallocate the register assigned to the first logical operand when an executed third instruction having another register assigned for a third logical operand as a destination is ready to retire or is retired.

33. A processor comprising:

a plurality of registers;

an allocator to assign a register to a logical operand of an instruction having the logical operand as a destination;

an execution unit to execute the instruction;

a retirement unit to retire the executed instruction and to delay deallocation of the register assigned to the logical operand; and microcode to assign the register to the same logical operand for an instruction to be re-executed.

34. The processor of claim 33, the retirement unit to identify the register assigned to the logical operand when an instruction other than the retired executed instruction is ready to retire or is retired.

35. The processor of claim 33, the retirement unit to write an identifier for the register to a back out register.

36. The processor of claim 33, the microcode to assign the register to the same logical operand in response to an exception.

37. A method comprising:

retiring an executed first instruction having a first logical operand as a destination;

retiring an executed second instruction having a second logical operand as a destination;

delaying deallocating of a register assigned to the first logical operand to back out of an architectural state, wherein the delaying is performed when the second instruction is ready to retire or is retired and wherein the delaying comprises writing an identifier for the register to a back out register;

assigning the register to a third logical operand for an instruction to be re-executed, wherein the assigning is performed in response to detecting an exception; and executing the instruction to be re-executed.

38. The method of claim 37, wherein the first, second, and third logical operands are the same.

39. The method of claim 37, wherein the first, second, and third logical operands each belong to a same class of operands.

40. A processor comprising:

a plurality of registers;

an allocator to assign registers to logical operands of instructions;

at least one execution unit to execute instructions;

a retirement unit to retire executed instructions and to deallocate registers for retired instructions, the retirement unit to delay deallocation of a register assigned to a first logical operand of a retired first instruction having the first logical operand as a destination to back out of an architectural state, the retirement unit to delay deallocation of the register assigned to the first logical operand when a second instruction having a second logical operand as a destination is ready to retire or is retired, the retirement unit to write an identifier for the register to a back out register; and microcode to assign the register to a third logical operand for an instruction to be re-executed, the microcode to assign the register to the third logical operand in response to an exception.

41. The processor of claim 40, wherein the first, second, and third logical operands are the same.

42. The processor of claim 40, wherein the first, second, and third logical operands each belong to a same class of operands.

* * * * *